United States Patent
Morita et al.

(10) Patent No.: US 7,936,387 B2
(45) Date of Patent: May 3, 2011

(54) PHASE ADJUSTMENT DEVICE, PHASE ADJUSTMENT METHOD AND DIGITAL CAMERA

(75) Inventors: Michiko Morita, Osaka (JP); Masahiro Ogawa, Osaka (JP); Mayu Ogawa, Osaka (JP); Kenji Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 712 days.

(21) Appl. No.: 11/945,464

(22) Filed: Nov. 27, 2007

(65) Prior Publication Data

US 2008/0309803 A1  Dec. 18, 2008

(30) Foreign Application Priority Data

Nov. 27, 2006  (JP) ................. 2006-318557

(51) Int. Cl.
*H04N 5/20* (2006.01)
*H04N 5/235* (2006.01)
(52) U.S. Cl. .................... 348/255; 348/229.1
(58) Field of Classification Search ............. 348/262, 348/255, 221.1, 22.1, 364, 362, 229.1
See application file for complete search history.

(56) References Cited

U.S. PATENT DOCUMENTS

| 4,200,884 | A | | 4/1980 | Nagumo |
| 5,406,329 | A | | 4/1995 | Kashimura et al. |
| 5,880,782 | A | * | 3/1999 | Koyanagi et al. ............ 348/364 |
| 7,283,171 | B2 | * | 10/2007 | Sakaguchi ................... 348/362 |
| 7,626,616 | B2 | * | 12/2009 | Kokubo et al. ............ 348/229.1 |
| 2005/0200744 | A1 | * | 9/2005 | Kobayashi ................... 348/362 |

FOREIGN PATENT DOCUMENTS

JP  2005-151081  6/2005

* cited by examiner

*Primary Examiner* — David L Ometz
*Assistant Examiner* — Ahmed A Berhan
(74) *Attorney, Agent, or Firm* — McDermott Will & Emery LLP

(57) ABSTRACT

An intended-usage judger judges an intended usage of an inputted digital imaging signal. A selector selects one or a plurality of signals to be inspected from a group of signals constituting the digital imaging signal based on a result of the judgment by the intended-usage judger. A phase adjuster adjusts a phase of a pulse used when the digital imaging signal is picked up based on an output state of the signal to be inspected.

3 Claims, 9 Drawing Sheets

| pulse to be adjusted | DS2 set value | DS1 set value | ACK set value |
| --- | --- | --- | --- |
| DS2 | ⟨adjusted value⟩ | initial value | initial value |
| DS1 | optimum value | ⟨adjusted value⟩ | initial value |
| ACK | optimum value | optimum value | ⟨adjusted value⟩ | optimum value of phase optimum value of phase

F I G. 7
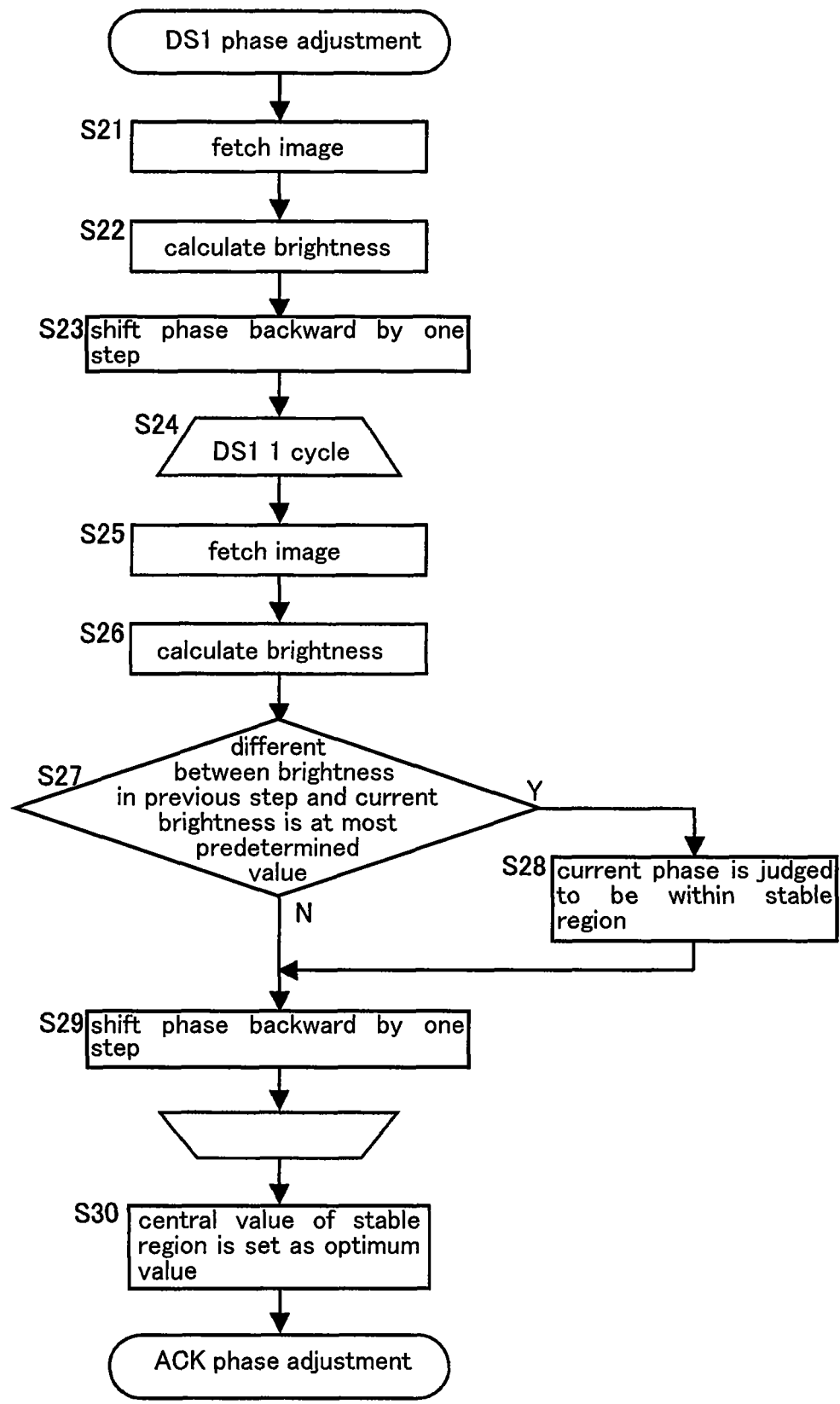

PHASE ADJUSTMENT DEVICE, PHASE ADJUSTMENT METHOD AND DIGITAL CAMERA

BACKGROUND OF THE INVENTION

1. Field of the Invention

The present invention relates to a phase adjustment device and a phase adjustment method for adjusting a phase (timing) of a pulse used when an image is obtained by a digital camera, and a digital camera in which the phase adjustment device is incorporated.

2. Description of the Related Art

In a digital camera, (digital still camera, digital video camera, mobile telephone provided with a camera, and the like), an analog imaging signal obtained by an imaging element such as CCD or an MOS sensor is converted into a digital imaging signal, and then, processed in a predetermined manner and recorded. In order to obtain an image of a photographic subject using the imaging element, a pulse for driving the imaging element, a pulse for detecting a signal level, and the like, are necessary, and it is difficult to adjust phases of these pulses in the hardware designing stage due to variability generated in the manufacturing process. Therefore, the phases are adjusted by a technician after the manufacturing process, and information showing the adjusted phases is stored in a memory region and read from the memory region when the product is actually used so that the phases are optimally set.

There is a known conventional technology wherein only a noise element is fetched in a minimum exposure time, and the phase is adjusted under such a condition that a high-frequency component (noise element) is minimized. An example of the technology is recited in No. 2005-151081 of the Japanese Patent Applications Laid-Open.

In the field of the digital camera, various changes may be made to a system where a phase adjustment device is incorporated. In the case where the digital camera is adopted as a hospital-use camera, it is possible to exchange the imaging element after the digital camera is manufactured. In the case where the system provided with the digital camera or the imaging element is thus subjected to some change, the phase of the pulse which drives the changed component is naturally different, which makes it necessary to readjust the phase. However, it is difficult to speedily and easily change the system or replace the imaging element when a technician manually readjusts the phase.

In the Document mentioned above, a characteristic of each pulse is disregarded though the pulses to be adjusted range in a plurality of types, and it is demanded that the phases of all of the pulses be optimized in the same method. Therefore, it is not possible to expect a high accuracy in the phase adjustment.

SUMMARY OF THE INVENTION

Therefore, a main object of the present invention is to more accurately adjust a phase of a pulse for driving an imaging element.

In order to achieve the foregoing object, a phase adjustment device according to the present invention comprises:

an intended-usage judger for judging an intended usage of an inputted digital imaging signal;

a selector for selecting one or a plurality of signals to be inspected from a group of signals constituting the digital imaging signal based on a result of the judgment by the intended-usage judger; and a phase adjuster for adjusting a phase of a pulse used when the digital imaging signal is picked up based on an output state of the signal to be inspected.

In the phase adjustment device thus constituted, the intended usage of the inputted digital imaging signal is judged by the intended-usage judger, and the judgment result is given to the selector. The selector, which received the judgment result from the intended-usage judger, selects the signal to be inspected in accordance with the judgment result. The phase adjuster adjusts the phase of the pulse for imaging the digital imaging signal based on the output state of the signal to be inspected. The phase adjustment of the pulse is suitable for, for example, the phase adjustment of a peak sample pulse for sampling a peak signal component in a signal period or the phase adjustment of a reference sample pulse for sampling a signal component used as a reference in the correlative double sampling.

As a preferable mode of present invention, a dispersion calculator calculates a dispersion which shows a signal variation between a plurality of pixels in a second pixel region of the signal to be inspected and gives an information of the dispersion to a timing adjuster. The timing adjuster adjusts the phase of the pulse based on the received dispersion information. The phase adjustment of the pulse based on the dispersion information is suitable for the phase adjustment of an AD clock signal which is an operation clock when an analog imaging signal is AD-converted into a digital imaging signal.

The phase adjustment described so far is automatically implemented by the intended-usage judger, selector, brightness level detector, dispersion calculator and timing adjuster in a cooperative manner. Further, when the phase of the pulse is adjusted when the usage is changed (when a system where the phase adjustment device is installed is changed or the imaging element is exchanged, or the like), the brightness level detector measures the brightness levels of the digital imaging signals of a plurality of pixels, and the dispersion calculator calculates the dispersion which shows the signal variation between the pixels. Then, the phase of the pulse is adjusted in such a manner that the factors of the brightness and the dispersion are included in the adjustment, which, therefore, increases the accuracy in the phase adjustment of the pulse for driving the imaging element. Further, an amount of time necessary for the adjustment can be reduced in comparison to the case where a technician manually adjusts the phase of the pulse because the phases of the respective pulses for driving the imaging element are automatically adjusted.

The selector may select a color signal as the signal to be inspected, which is often applied to a hospital-use camera system.

As another preferably mode of the present invention, the phase adjustment device further comprises a sampling method judger for calculating a cycle and a phase adjustment amount of the sampling as criteria of the phase adjustment based on an image size, a frame rate and a resolution necessary for the usage judged by the intended-usage judger. The cycle of the sampling is determined by what degree the phase is extended or reduced relative to an initial value of the cycle. The phase adjustment amount of the sampling is a step adjustment amount of the phase when an optimum phase is calculated.

The sampling method judger, as a sampling method, calculates the cycle and the phase adjustment amount which satisfy the conditions such as the image size, frame rate, resolution and the like required in the usage of the digital imaging signal judged by the intended-usage judger and gives a result of the calculation to the brightness level detector, dispersion calculator and timing adjuster. The timing adjuster adjusts the phase in the foregoing manner based on the received cycle and phase adjustment amount. When the image size is large and the resolution is high, an image quality is more emphasized than a processing speed, wherein the cycle is extended, and the phase adjustment amount is finely set. When the image size is small and the resolution is low, the processing speed is more emphasized than the image quality, wherein the cycle is reduced, and the phase adjustment amount is roughly set. Therefore, in the case where the system provided with the phase adjustment device is changed or the imaging element itself is replaced, the phase of the pulse for driving the imaging element can be automatically adjusted in the state where the degree of the emphasis on the image quality or the processing speed is finely set depending on the conditions such as the image size, frame rate and resolution.

A digital camera according to the present invention in relation to the phase adjustment device thus constituted comprises:

an imaging element;

a correlated double sampling unit for executing the correlated double sampling to an analog imaging signal obtained by the imaging element and determining a signal level by each pixel;

an automatic gain controller for adjusting an amplitude of the analog imaging signal whose signal level is determined by the correlated double sampling unit;

an AD converter for converting the analog imaging signal whose amplitude is adjusted by the automatic gain controller into a digital imaging signal;

a timing generator for generating a pulse used when the analog imaging signal is picked up; and the phase adjustment device according to the present invention for adjusting a phase of the pulse generated by the timing generator.

It is unnecessary to describe the imaging element, correlated double sampling unit, automatic gain controller, and AD converter and timing generator, which are the structural components of the present invention, because they are the components conventionally provided in a digital camera. The present invention is characterized in that the phase adjustment device according to the present invention is provided in the digital camera.

A phase adjustment method according to the present invention includes:

a judging step for judging an intended usage of an inputted digital imaging signal;

a selecting step for selecting one or a plurality of signals to be inspected from a group of signals constituting the digital imaging signal based on a result of the judgment by an intended-usage judger; and an adjusting step for adjusting a phase of a pulse used when the digital imaging signal is picked up based on an output state of the signal to be inspected.

In the phase adjustment method according to the present invention, the pulse preferably includes a peak sample pulse for detecting a peak level of an analog imaging signal outputted from the imaging element, a reference sample pulse for detecting a signal level used as a reference when the analog imaging signal is subjected to the correlated double sampling, and an AD clock signal necessary for AD-converting the analog imaging signal, wherein the adjusting step includes:

a step of detecting a first phase at which a brightness level is maximized by changing a phase of the peak sample pulse in a state where a phase of the reference sample pulse and a phase of the AD clock signal are fixed to an initial value, the step further setting the detected first phase as an optimum phase of the peak sample pulse;

a step of detecting a stable region in which variation of the brightness level is small by changing the phase of the reference sample pulse in a state where the phase of the peak sample pulse is fixed to the first phase and the phase of the AD clock signal is fixed to the initial value, the step further setting a second phase which is a center of the stable region as an optimum phase of the reference sample pulse; and a step of fixing the phase of the peak sample pulse to the first phase and the phase of the reference sample pulse to the second phase and detecting a third phase at which dispersion is minimized by changing the phase of the AD clock signal in a state where an incident light is blocked, the step further setting the detected third phase as an optimum phase of the AD clock signal.

In the foregoing phase adjustment method, when the phase of the pulse is adjusted in the case where the usage of the digital imaging signal is changed or the imaging element is replaced, the brightness level is measured by the brightness level detector in each of the plurality of pixels, and the dispersion which shows the signal variation between the pixels is calculated by the dispersion calculator, so that the phase of the pulse is adjusted in such a manner that the factors of the brightness and the dispersion are included in the adjustment. Accordingly, the phase of the pulse for driving the imaging element can be adjusted with a high accuracy, and the phases of the pulses for driving the imaging element can be automatically adjusted. As a result, the amount of time necessary for the phase adjustment can be reduced in comparison to the case where the phase adjustment of the pulse is manually done by the technician.

The adjusting step preferably further includes a step of calculating a cycle and a phase adjustment amount of the sampling as criteria of the phase adjustment based on an image size, a frame rate and a resolution required in the usage judged in the judging step in each of the peak sample pulse, reference sample pulse and AD clock signal.

As a result, the phase of the pulse for driving the imaging element can be automatically adjusted in the state where the degree of the emphasis on the image quality or the processing speed is finely set depending on the conditions such as the image size, frame rate and resolution.

According to the present invention, the phase of the pulse for driving the imaging element can be automatically adjusted though the usage may be changed or the imaging element may be replaced. As a result, the amount of time necessary for the phase adjustment can be reduced in comparison to the case where the phase adjustment of the pulse is manually done by the technician, and the phase of the pulse can be highly accurately adjusted. The detection of the brightness level and the calculation of the dispersion can be performed in the cooperative manner, and the accuracy in the phase adjustment of the pulse can be thereby increased.

Further, the phase of the pulse for driving the imaging element can be automatically adjusted in the state where the degree of the emphasis on the image quality or the processing speed is finely set depending on the conditions such as the image size, frame rate and resolution.

The present invention is applicable to a digital camera which may be required to timing-adjust a pulse used in an imaging operation.

BRIEF DESCRIPTION OF THE DRAWINGS

These and other objects as well as advantages of the invention will become clear by the following description of preferred embodiments of the invention. A number of benefits not recited in this specification will come to the attention of the skilled in the art upon the implementation of the present invention.

FIG. 7 is a flow chart showing a detailed operation of the phase adjustment of the reference sample pulse according to the preferred embodiment.

DETAILED DESCRIPTION OF THE INVENTION

Figure 1:
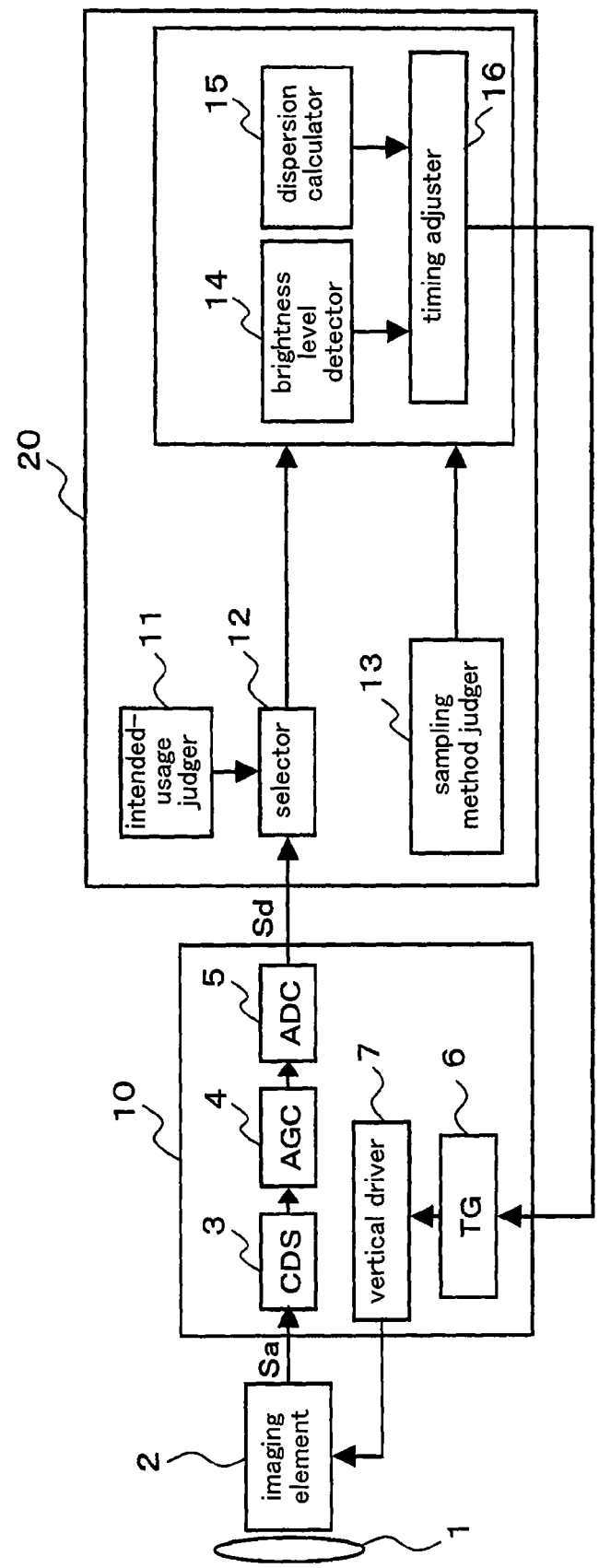
FIG. 1 is a block diagram illustrating an overall constitution of a digital camera provided with a phase adjustment device according to a preferred embodiment of the present invention.

Hereinafter, a preferred embodiment of a digital camera provided with a phase adjustment device according to the present invention is described in detail referring to the drawings. FIG. 1 is a block diagram illustrating an overall constitution of a digital camera provided with a phase adjustment device according to the preferred embodiment. The digital camera according to the present preferred embodiment comprises an optical lens 1 for converging an image of a photographic subject on an imaging element 2, the imaging element 2 for obtaining the image of the photographic subject converged thereon by the optical lens 1 (description is given below referring to CCD as an example of the imaging element 2), an analog front end 10 for executing predetermined processings to an analog imaging signal Sa outputted from the imaging element 2 and converting the resulting signal into a digital imaging signal Sd, and a DSP (Digital Signal Processor) 20 for generating a video signal by executing predetermined processings (color correction, YC processing and the like) to the digital imaging signal Sd outputted from the analog front end 10. The imaging element 2 includes a plurality of pixels, and the plurality of pixels comprises an effective pixel region used for obtaining the image of the photographic subject, and an OB pixel region provided in a periphery of the effective pixel region in a light-blocking manner and used for detection of the OB (Optical Black) level.

The analog front end 10 comprises a CDS (Correlated Double Sampling) unit 3 for executing the CDS in order to identify a signal level of the analog imaging signal Sa outputted from the imaging element 2, an AGC (Automatic Gain Controller) 4 for amplifying the signal outputted from the CDS unit 3 using an adjustable gain, an ADC (Analog Digital Converter) 5 for converting the signal amplified by the AGC 4 into the digital imaging signal Sd, a timing generator 6 for generating a pulse used when the image is obtained, and a vertical driver 7 for outputting the pulse generated by the timing generator 6 to the imaging element 2.

The DSP 20 comprises an intended-usage judger 11, a selector 12, a sampling method judger 13, a brightness level detector 14, a dispersion calculator 15 and a timing adjuster 16, which are the structural components according to the present invention.

The intended-usage judger 11 judges an intended usage of phase adjustment. The selector 12 selects an arbitrary color signal as a signal to be inspected in accordance with a result of the judgment by the intended-usage judger 11. The sampling method judger 13 calculates a cycle and a phase adjustment amount as criteria of the phase adjustment in relation to a reference sample pulse DS1, a peak sample pulse DS2 and an AD clock signal ACK so that conditions such as an image size, a frame rate and a resolution demanded in the usage judged by the intended-usage judger 11 are satisfied. The brightness level detector 14 calculate an average value of the signal levels of the pixels selected in a predetermined region to thereby detect the brightness level. The dispersion calculator 15 calculates the dispersion of the signal levels in the selected pixels. The timing adjuster 16 adjusts the phases (timings) of the reference sample pulse DS1, peak sample pulse DS2 and AD clock signal ACK generated by the timing generator 6 based on the results of the detection and the calculation by the brightness level detector 14 and the dispersion calculator 15.

Figure 2:
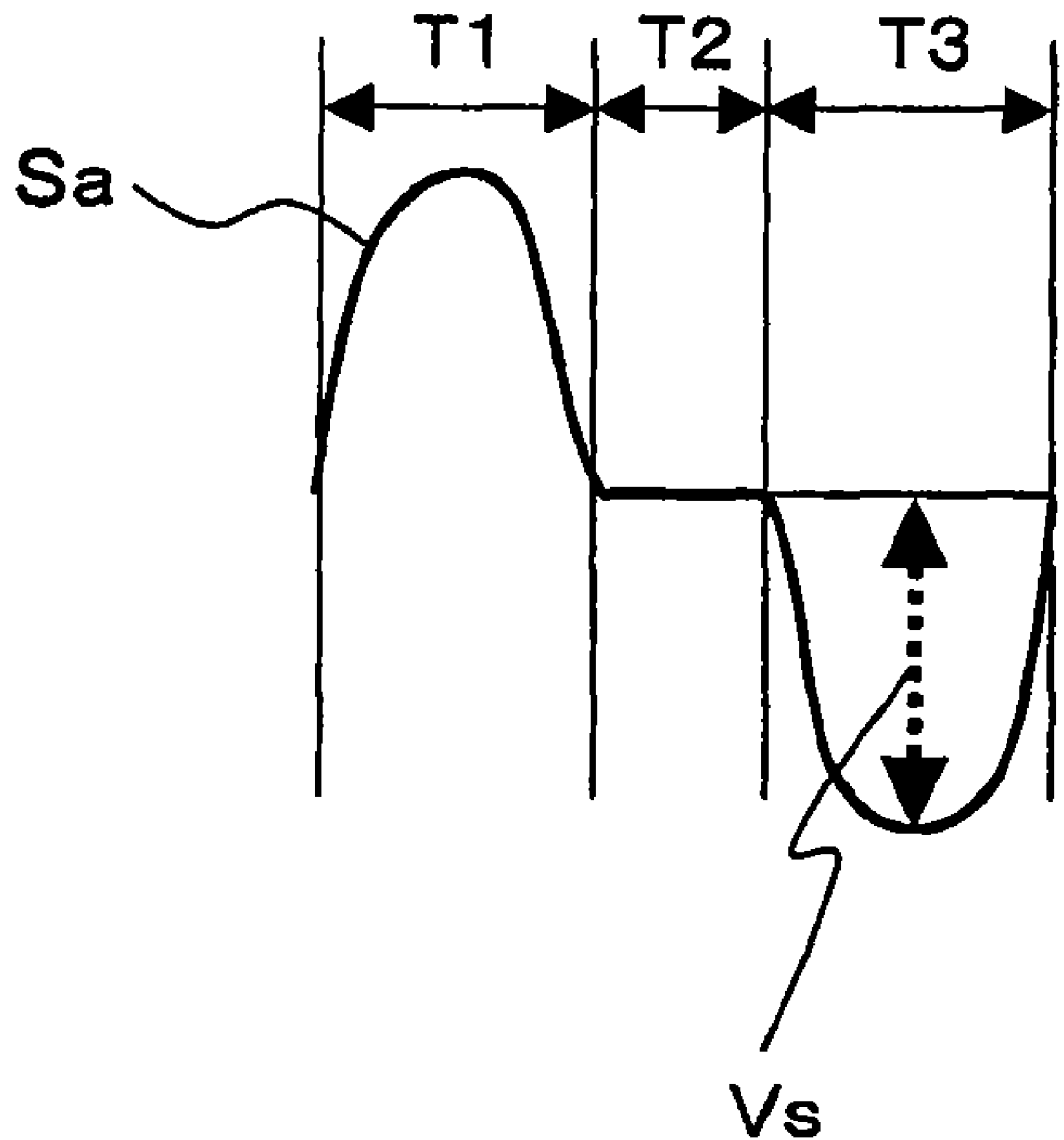
FIG. 2 is a drawing which chronologically shows a signal component outputted from an imaging element.

FIG. 2 is a drawing which chronologically shows a signal component outputted from the imaging element 2. As shown in FIG. 2, the analog imaging signal Sa includes a reset period T1, a reference period T2 and a signal period T3. The reset period T1 is a period when the imaging element 2 is reset. The reference period T2 is a period when a reference voltage is outputted from the imaging element 2, and a signal, which is a reference in the operation of the correlated double sampling unit 3, is detected during this period. The signal period 3 is a period when a signal voltage is outputted. When the signal voltage which marks a peak in the signal period T3 and the reference voltage in the reference period T2 are subjected to the sampling so that a difference therebetween is obtained, a signal level Vs of the analog imaging signal Sa is obtained. In FIG. 2, a downward direction in the drawing is defined as the signal component in the positive direction.

In the foregoing constitution, the intended-usage judger 11 judges the usage of the digital imaging signal outputted from the digital camera (including the usage of a camera system in which the digital camera is installed). Examples of the camera system recited in this specification include a camera system of a digital still camera, a camera system of a digital video camera, a camera system of a camera-attached mobile telephone, a camera system of a hospital-use camera, a camera system of a vehicle-use camera, a camera system of an entry phone, a camera system of a network camera and the like.

The intended-usage judger 11 judges the usage as follows. The intended-usage judger 11 fetches information showing a state of an imaging mode (moving picture mode/still image mode) in the digital camera system in which the phase adjustment device is incorporated from the digital camera system to thereby identify the usage of the digital imaging signal. Further, the intended-usage judger 11 fetches information showing a system configuration of the digital camera system in which the phase adjustment device is incorporated to thereby identify the usage of the digital imaging signal. Further, the intended-usage judger 11 may fetch information showing whether or not the imaging element of the digital camera system was replaced from the digital camera system and handle the fetched information showing the replacement of the imaging element in a manner similar to the information showing the changed usage.

The selector 12 selects one or a plurality of color signals (RGB) as the signal to be inspected based on the judgment result relating to the usage made by the intended-usage judger 11.

The sampling method judger 13 judges the conditions such as the image size, frame rate and resolution demanded in the camera system. Then, the sapling method judger 13 calculates the cycle and the phase adjustment amount of the sampling as criteria of the phase adjustment in relation to the reference sample pulse DS1, peak sample pulse DS2 and AD clock signal ACK so that all of the conditions are satisfied, and outputs the calculated values to the brightness level detector 14, dispersion calculator 15 and timing adjuster 16.

Below are described the cycle and the phase adjustment amount of the sampling as criteria of the phase adjustment. The cycle of the sampling is defined based on number of times when the phase is extended/reduced from an initial value of the cycle. The phase adjustment amount of the sampling is a step adjustment amount of the phase when an optimum phase is calculated. In the case of the phase adjustment for emphasizing the image quality, for example, the cycle is extended, and the phase adjustment amount is finely adjusted. In the case of the phase adjustment for emphasizing the processing speed, for example, the cycle is reduced, and the phase adjustment amount is roughly adjusted.

Figures 3A, 3B:
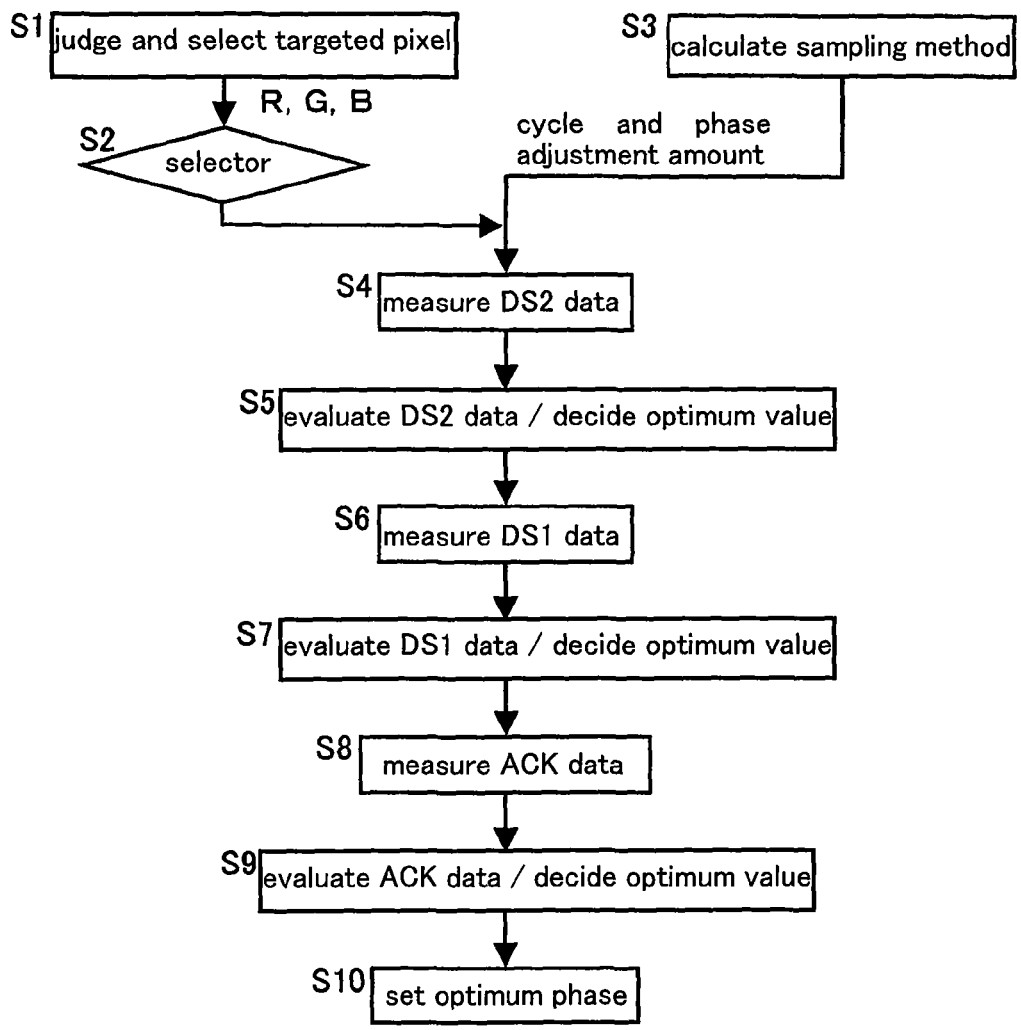
FIG. 3A is a flow chart showing an overall operation of phase adjustment according to the preferred embodiment.
FIG. 3B shows an example of a set value of each pulse when the phase is adjusted according to the preferred embodiment.

FIG. 3A shows an overall flow of the phase adjustment of each pulse according to the present preferred embodiment. FIG. 3B shows details of a method of adjusting the pulse to be adjusted. The intended-usage judger 11 mainly judges the usage of the camera. Based on the usage judged by the intended-usage judger 11, the selector 12 instructs a particular signal (color signal or the like) as the signal to be inspected. At the same time, the sampling method judger 13 calculates the cycle and the phase adjustment amount of the sampling. The brightness level detector 14, dispersion calculator 15 and timing adjuster 16 adjust the phase based on the calculation result of the sampling method judger 13.

The pulses which are adjusted by the phase adjustment device according to the present preferred embodiment are the reference sample pulse DS1, peak sample pulse DS2 and AD clock signal ACK. The reference sample pulse DS1 is a pulse for sampling the signal component used as the reference in the correlated double sampling. Therefore, the phase of the reference sample pulse is desirably adjusted so that a rising edge arrives at the center of the reference period. The peak sample pulse DS2 is a pulse for sampling the signal component which is a peak in the signal period T3. Therefore, the phase of the peak sample pulse DS2 is desirably adjusted so that the rising edge arrives when the signal component outputted from the imaging element 2 marks its peak. The signal level Vs calculated by the correlated double sampling unit 3 is a difference between the signal component at the peak in the rise of the peak sample pulse DS2 and the signal component in the reference period defined by the rise of the reference sample pulse DS1. The AD clock signal ACK is a clock signal for operating the AD converter 5. Therefore, in the AD clock signal ACK, the phase is desirably adjusted so as to avoid variability in the AD conversion result.

In the present preferred embodiment, the intended-use judger 11 judges the usage of the digital camera (Step S1).

Next, the selector 12 selects and instructs the signal to be inspected (color signal or the like) (Step S2). At the same time, the sampling method judger 13 calculates the cycle and the phase adjustment amount of the sampling, and fixes the phases of the reference sample pulse DS1 and the AD clock signal ACK to a predetermined initial value based on the calculated values (Step S3). Then, data necessary for deciding the phase of the peak sample pulse DS2 is measured in such a manner that the phase of the peak sample pulse DS2 is gradually shifted from the initial value (Step S4). Next, the data measured in the Step S4 is evaluated so that the optimum phase of the peak sample pulse DS2 is decided (Step S5). When the phase of the peak sample pulse DS2 is decided, the phase of the peak sample pulse DS2 is fixed to the optimum value. Further, data necessary for deciding the phase of the reference sample pulse DS1 is measured in such a manner that the phase of the reference sample pulse DS1 is gradually shifted from the initial value, while the phase of the AD clock signal ACK is fixedly retained at the initial value (Step S6). Next, the data measured in the Step S6 is evaluated so that the optimum phase of the reference sample pulse DS1 is decided (Step S7). After the phases of the reference sample pulse DS1 and the peak sample pulse DS2 are decided, data necessary for deciding the phase of the AD clock signal ACK is measured in such a manner that the phase of the AD clock signal ACK is gradually shifted from the initial value, while the phases of the reference sample pulse DS1 and the peak sample pulse DS2 are fixedly retained at the optimum values (Step S8). Next, the data measured in the Step S8 is evaluated so that the optimum phase of the AD clock signal ACK is decided (Step S9). After the optimum phases of the reference sample pulse DS1, peak sample pulse DS2 and AD clock signal ACK are decided, information relating to the decided optimum phases is set in a register in the timing generator 6 (Step S10). Thus, the pulses with the optimum phases are generated.

Next, details of the processings in the intended-usage judger 11 and the sampling method judger 13 are described referring to the digital camera as an example. The sampling method judger 13 judges what sampling method is to be applied depending on the camera system in which the phase adjustment device is incorporated. Below are described the specific sampling methods to be applied in the case where the camera system in which the phase adjustment device is incorporated is a digital still camera system and in the case where the camera system in which the phase adjustment device is incorporated is a hospital-use camera.

a) Digital Still Camera System

When the intended-usage judger 11 judges that the camera system in which the phase adjustment device is incorporated (usage) is a digital still camera system, the selector 12 instructs to sample R, G and B signals as the signals to be inspected. The description continues provided that the conditions demanded in the digital camera system are as follows.
image size: full size
frame rate: 30 fps
resolution: high The sampling method judger 13 calculates the cycle and the phase adjustment amount which satisfy all of the conditions given by the specification of the timing generator 6 in order to sample the reference sample pulse DS1, peak sample pulse DS2 and AD clock signal ACK, and decides the calculated values as the cycle and the phase adjustment amount to be finally decided. Under the conditions in which the image size is the full size and the resolution is high, the image quality is more emphasized than the processing speed.

b) Hospital-Use Camera System

When the intended-usage judger 11 judges that the camera system in which the phase adjustment device is incorporated (usage) is a hospital-use camera system, the selector 12 instructs to sample the R signal as the signal to be inspected. The description continues provided that the conditions demanded in the hospital-use camera system are as follows.

image size: QVGA
frame rate: 30 fps
resolution: low

The sampling method judger 13 calculates the cycle and the phase adjustment amount which satisfy all of the conditions given by the specification of the timing generator 6 in order to sample the reference sample pulse DS1, peak sample pulse DS2 and AD clock signal ACK, and decides a cycle obtained by thinning the obtained value by 1/N time as the phase adjustment amount. Under the conditions in which the image size is the QVGA and the resolution is low, the processing speed is more emphasized than the image quality.

Next, the adjustment of the phases of the peak sample pulse DS2, reference sample pulse DS1 and AD clock signal ACK are described below.

Phase Adjustment of the Peak Sample Pulse DS2

Figure 4:
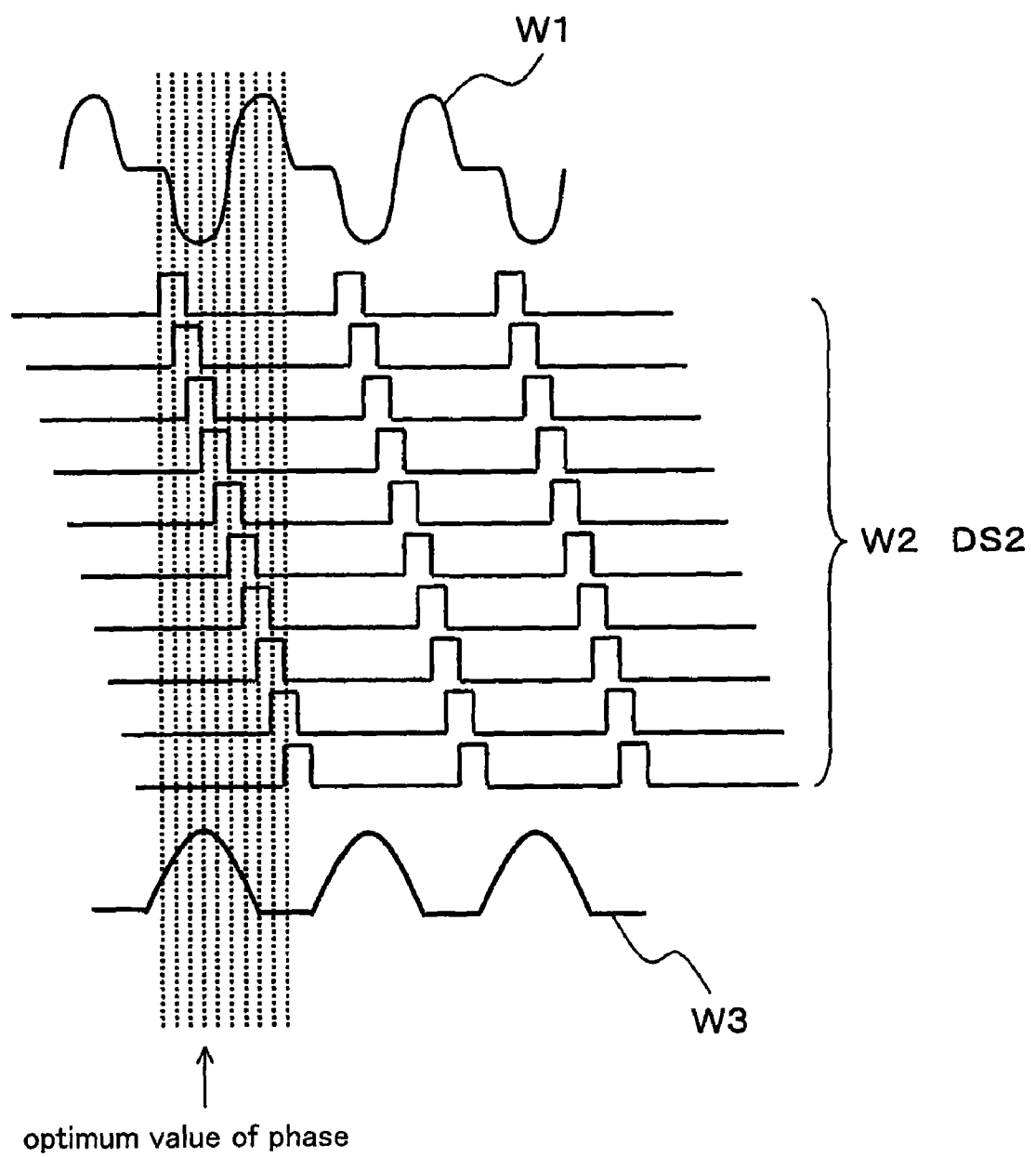
FIG. 4 is a timing chart of a signal component used for the phase adjustment of a peak sample pulse according to the preferred embodiment.
Figure 5:
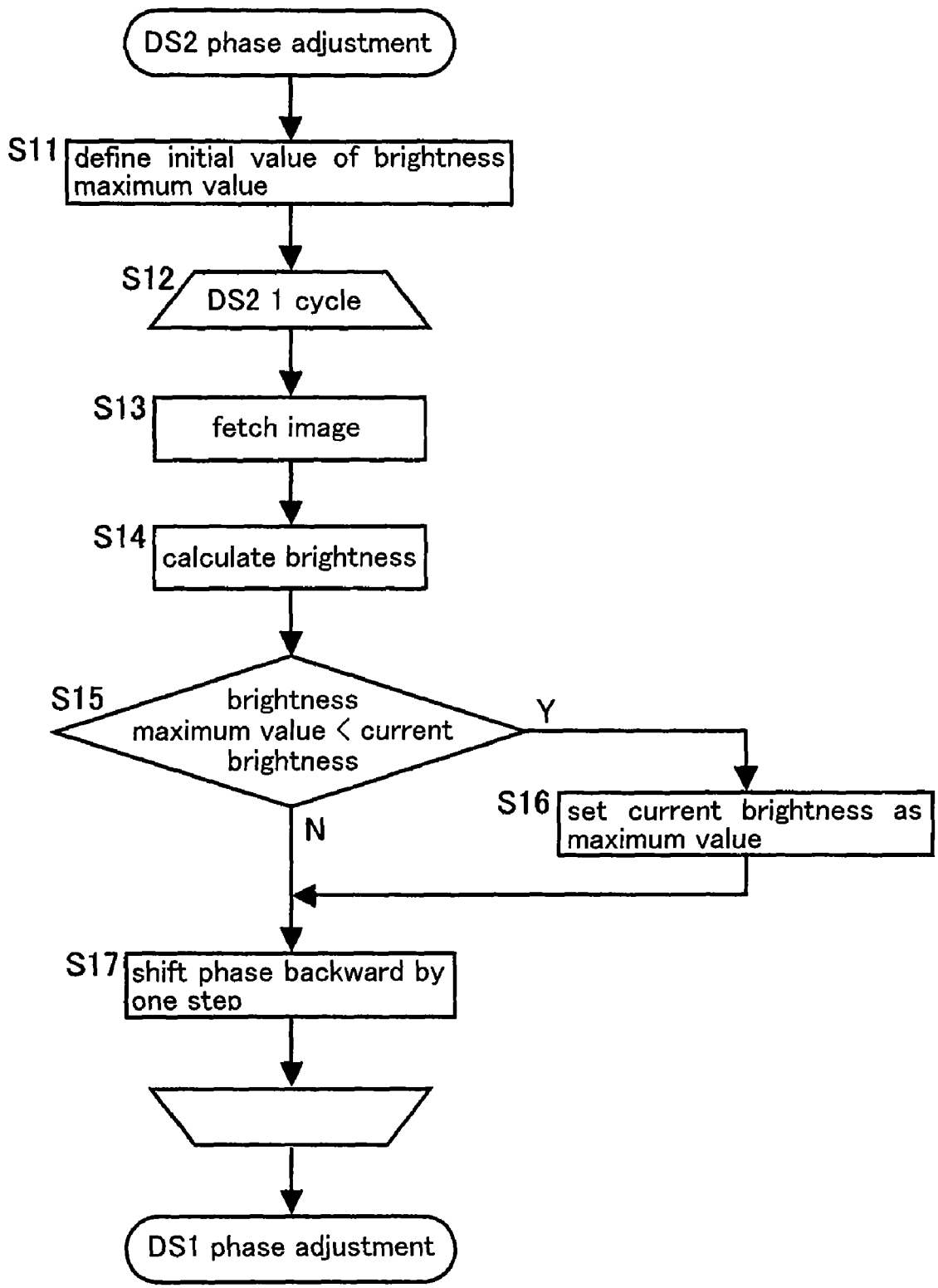
FIG. 5 is a flow chart showing a detailed operation of the phase adjustment of the peak sample pulse according to the preferred embodiment.

First, the phase adjustment of the peak sample pulse DS2 is described referring to FIGS. 4 and 5. FIG. 4 is a timing chart of the signal component used for the phase adjustment of the peak sample pulse DS2. FIG. 5 is a flow chart showing details of the phase adjustment of the peak sample pulse DS2. These drawings correspond to the Steps S4 and S5 shown in FIG. 3.

In FIG. 4, W1 denotes an imaging element output signal, and W3 denotes a brightness signal. The brightness in the phase adjustment of the peak sample pulse DS2 is defined as an average value of the signal levels of the respective pixels selected in a part or all of the effective pixel region of the imaging element 2 (which is a first pixel region, and hereinafter referred to as a peak sample pulse detecting region). When the imaging element output signal W1 is in the state shown in FIG. 4, the phases of the reference sample pulse DS1 and the AD clock signal ACK are fixed, and the phase of the peak sample pulse DS2 is then shifted as shown in W2, protruding shapes are generated in the brightness signal W3, which generates peaks in its signal level. Based on the that, the phase of the peak sample pulse DS2 in the state where the brightness signal W3 is at the maximum level (peak state) is decided as its optimum phase. AS described earlier, the signal level Vs by each pixel selected in the image data is the difference between the peak value of the signal component decided by the peak sample pulse DS2 and the signal component as the reference decided by the reference sample pulse DS1. Therefore, the difference shows a negative value where the signal in the peak sample pulse DS2 and the signal component in the reference sample pulse DS1 are reversed to each other, however, the signal level is zero in the drawing because any negative value is not included in the definition of the signal level in this example.

Referring to FIG. 5 is given a further detailed description. In Step S11, an initial value of the maximum value of the brightness level is defined. As the initial value of the maximum value of the brightness level is set such a small value that is immediately updated in the presence of the signal component having at least a certain level of magnitude. In Step S12, the phases of the reference sample pulse DS1 and the AD clock signal ACK are set to the initial value, and a point which is chronologically slightly later than the initial value of the phase of the reference sample pulse DS1 is set as the initial value of the peak sample pulse DS2. In Step S13, the image data obtained by the imaging element 2 is fetched.

In Step S14, the brightness level in the peak sample pulse detecting region of the fetched image data is detected, in other words, the average value of the signal levels of the respective pixels in the peak sample pulse detecting region is calculated. Since it is assumed that any pixel having the signal level showing at least a predetermined value is saturated, such a pixel is desirably excluded in the sampling process. The processing of the Step S14 is executed in the brightness level detector 14.

In Step S15, the current maximum value of the brightness level and the brightness level calculated in the Step S14 are compared to each other. When the brightness level calculated in the Step S14 is larger as a result of the comparison, the brightness level calculated in the Step S14 is set as the current maximum value in Step S16. When the current maximum value of the brightness level is larger in the Step S15, the maximum value of the brightness level is not updated. The processings of the Steps S15 and S16 are executed by the timing adjuster 16.

In Step S17, the timing adjuster 16 transmits such an instruction to the timing generator 6 so that the phase of the peak sample pulse DS2 is shifted backward by one step in the state where the phases of the reference sample pulse DS1 and the AD clock signal ACK are fixed. After the phase is shifted by one step in the Step S17, the Steps S13-S17 are implemented again so that the maximum value of the brightness level is reset.

The operation described so far is repeated in the period of one cycle calculated by the sampling method judger 13 so that the phase when the brightness level is maximized is decided as the optimum phase of the peak sample pulse DS2.

Phase Adjustment of the Reference Sample Pulse DS1

Figure 6:
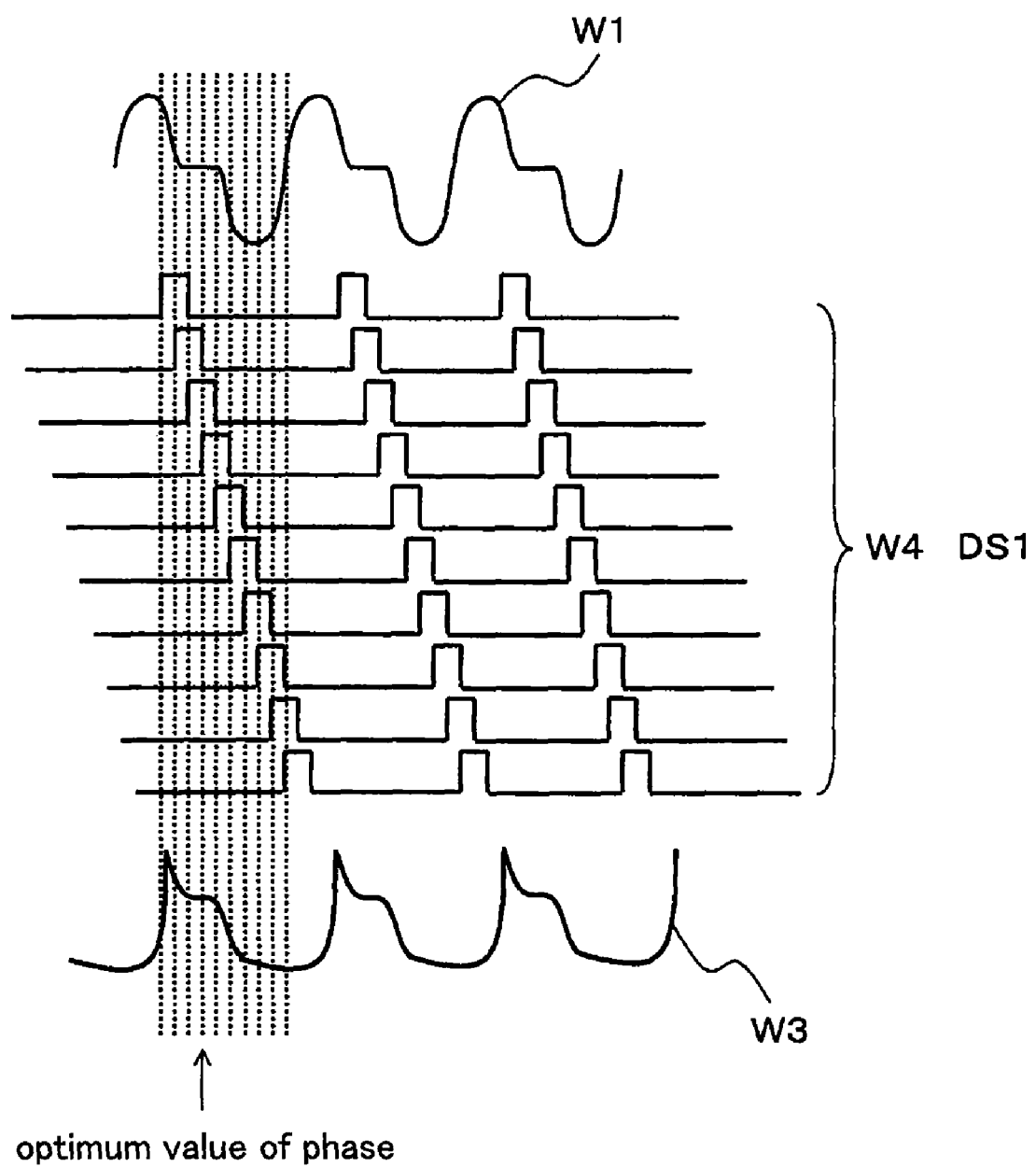
FIG. 6 is a timing chart of a signal component used for the phase adjustment of a reference sample pulse according to the preferred embodiment.

Next, the phase adjustment of the reference sample pulse DS1 is described referring to FIGS. 6 and 7. FIG. 6 is a timing chart of the signal component used for the phase adjustment of the reference sample pulse DS1. FIG. 7 is a flow chart showing details of the phase adjustment of the reference sample pulse DS1. These drawings correspond to the Steps S6 and S7.

In FIG. 6, W1 denotes an imaging element output signal, and W3 denotes a brightness signal. In the case of the phase adjustment of the reference sample pulse DS1, the brightness is defined as an average value of the signal levels of the respective pixels selected in a part or all of the effective pixel region of the imaging element 2 (referred to as a reference sample pulse detecting region). When the imaging element output signal is in the state shown in FIG. 6, the phases of the peak sample pulse DS2 and the AD clock signal ACK are fixed, and the phase of the reference sample pulse DS1 is then shifted as shown in W4, the brightness signal W3 is drastically reduced, substantially constant in the reference period, and then reduced again and becomes zero at a point corresponding to the peak sample pulse DS2. Based on that, the optimum value of the phase of the reference sample pulse DS1 is decided so that the rising edge arrives at the center of the interval (referred to as stable region) where the brightness signal W3 is substantially constant.

Referring to FIG. 7 is given a further detailed description. In Step S21, the phase of the reference sample pulse DS1 and the phase of the AD clock signal ACK are initialized, and the phase of the peak sample pulse DS2 is set to the optimum value decided by the described adjustment method. Then, the image data obtained by the imaging element 2 (analog video signal) is fetched.

In Step S22, the brightness level in the reference sample pulse detecting region of the fetched image data is detected, in other words, an average value of the signal levels of the respective pixels in the reference sample pulse detecting region is calculated. Since it is assumed that any pixel having the signal level showing at least a predetermined value is saturated, such a pixel is desirably excluded in the sampling process. The processing of the Step S22 is executed in the brightness level detector 14.

In Step S23, the phase of the reference sample pulse DS1 is shifted backward by one step in the state where the phases of the peak sample pulse DS2 and the AD clock signal ACK are fixed. In Step S24, a repetitive processing in the period of one cycle of the reference sample pulse DS1 is set. In Step S25, the image data obtained by the imaging element 2 is fetched. In Step S26, the brightness level in the reference sample pulse detecting region of the fetched image data is detected.

In Step S27, a difference between the brightness level calculated form the image data fetched at the phase of the reference sample pulse DS1 one step earlier and the brightness level calculated from the image data detected at the current phase is calculated, and it is judged whether or not the calculated difference is at most a predetermined threshold value. When the difference is judged to be at most the threshold value in the Step S27, the current phase is judged to be in the stable region (Step S28).

In Step S29, the phase of the reference sample pulse DS1 is shifted backward by one step in the state where the phases of the peak sample pulse DS2 and the AD clock signal ACK are fixed. After the shift of the phase by one step, the processings of Steps S25-S29 are implemented again so that it is judged if the shifted phase is in the stable region. This processing is repeatedly executed in the period of one cycle calculated by the sampling method judger 13 so as to judge what phases are included by the stable region.

Finally, in Step S30, a central value of the phases judged to be included in the stable region is decided as the optimum value of the phase of the reference sample pulse DS1. In the case where there are the phases judged to be included in the stable region in at least two discontinuous intervals, the shorter interval may be ignored, or the interval where the phase judged to be included in the stable region continues in a longest duration may be judged to be the stable region.

In the case where a noise component is large, the stable region may be wrongly detected or may not be detected at all based on the different between the two pixels. In that case, a filter calculator, for example, or the like, may be used so that a difference between an average value of the brightness levels in at least three phases and an average value of the brightness level in the current phase is calculated and compared to a threshold value.

The initial values of the phase of the reference sample pulse DS1 used in the phase adjustment flow of the reference sample pulse DS1 and in the phase adjustment flow of the peak sample pulse DS2 may be the same or different to each other. For example, the initial value of the phase of the reference sample pulse DS1 in the phase adjustment flow of the peak sample pulse DS2, for example, may be set to be in vicinity of the reference period predicted from the design specification. The initial value of the phase of the reference sample pulse DS1 for fetching the first image data in the phase adjustment flow of the reference sample pulse DS1 may be set to be within the reset period in order to reduce any sudden reduction of the brightness signal.

Phase Adjustment of the AD Clock Signal ACK

Figure 8B:
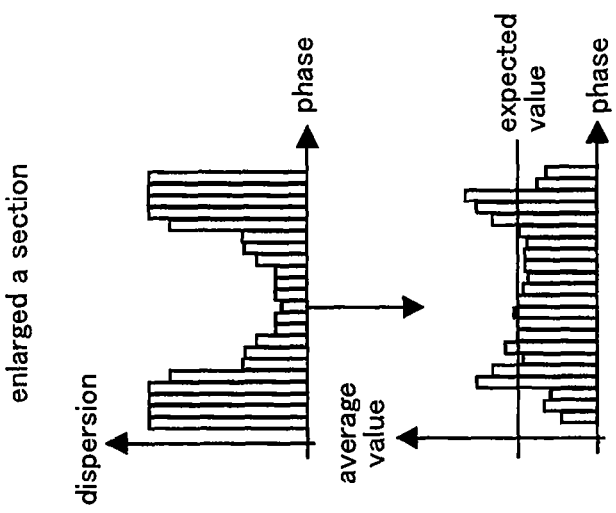
FIG. 8B is an enlarged view of an a part shown in FIG. 8A.
Figure 8A:
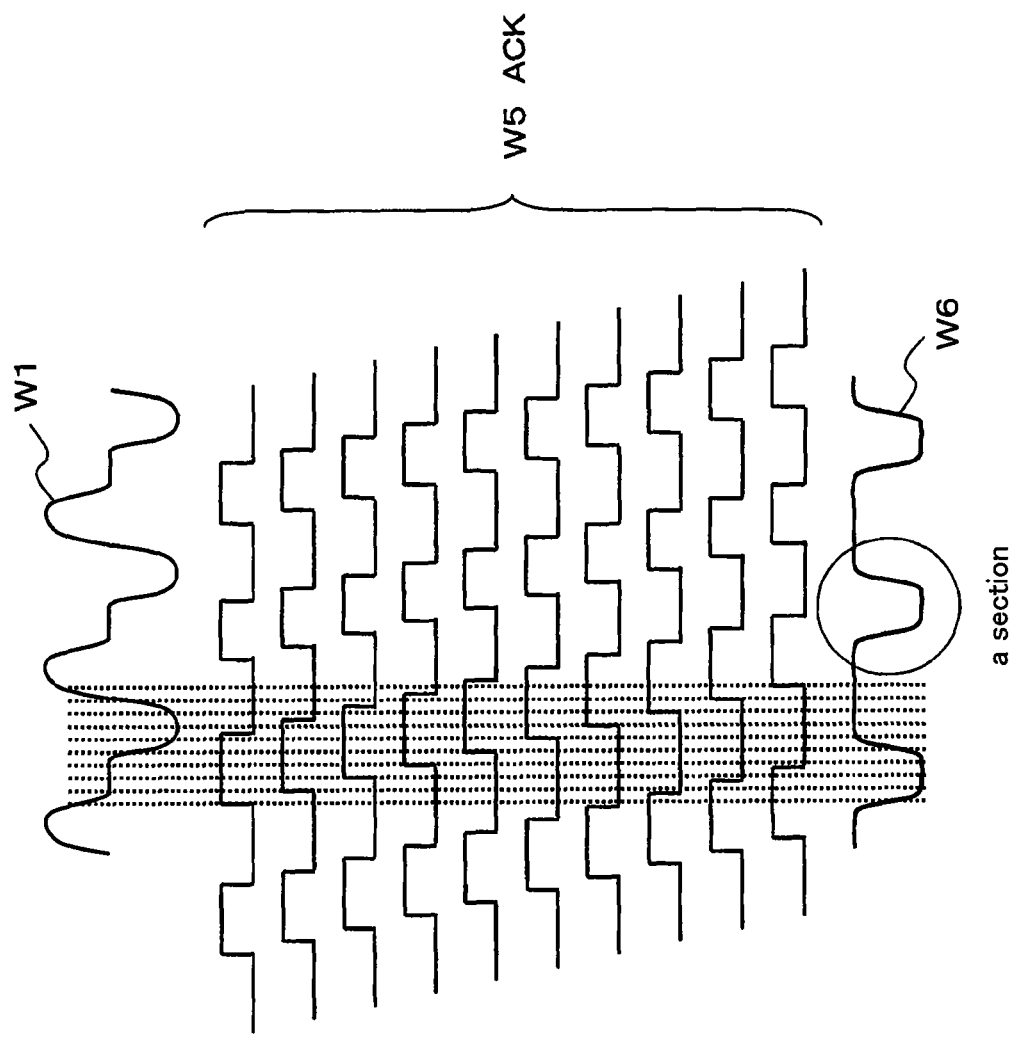
FIG. 8A is a timing chart of a signal component used for the phase adjustment of an AD clock signal according to the preferred embodiment.
Figure 9:
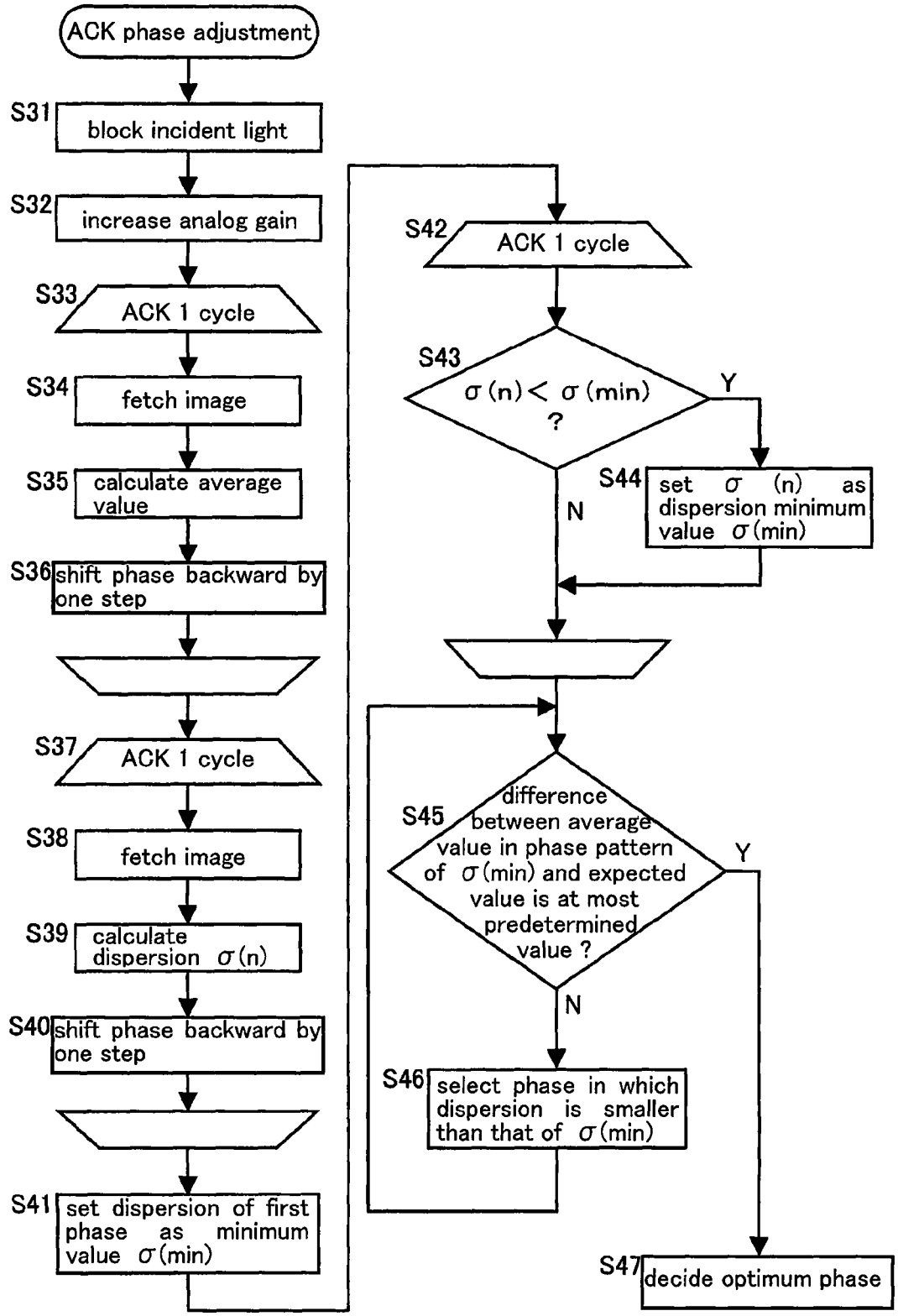
FIG. 9 is a flow chart showing a detailed operation of the phase adjustment of the AD clock signal according to the preferred embodiment.

Next, the phase adjustment of the AD clock signal ACK is described referring to FIGS. 8A, 8B and 9. FIG. 8A is a timing chart of the signal component used in the phase adjustment of the AD clock signal ACK. FIG. 8B shows the dispersal transition in the phase adjustment of the AD clock signal ACK. FIG. 9 is a flow chart showing details of the phase adjustment of the AD clock signal ACK. The flow chart shown in FIG. 9 corresponds to the Steps S8 and S9 shown in FIG. 3.

In FIG. 8, W1 denotes an imaging element output signal, and W6 denotes the dispersion. The dispersion in this example is defined as the dispersion of the signal levels of the respective pixels in a part or all of at least one of the effective pixel region and the OB pixel region (which is a second pixel region, and hereinafter referred to as an AD clock signal detecting region) in a state where light is blocked with respect to the imaging element 2. More specifically, the dispersion denotes a value which shows a degree of the dispersion of the signal levels which are supposed to be constant in an ideal situation because the imaging element 2 is in the light-blocking state. Therefore, it is necessary to set the phase of the AD clock signal ACK so that the dispersion is reduced. The pixel region for which the dispersion is calculated may or may not be the same pixel region for which the brightness level is detected.

When the imaging element output signal W is in the state shown in FIG. 8A, the phases of the reference sample pulse DS1 and the peak sample pulse DS2 are fixed to the optimum values, and the phase of the AD clock signal ACK is then shifted from the initial value as shown in W5, recessed shapes as shown in W6 are generated in the dispersion. The phase of the AD clock signal ACK should be decided so that the value of the dispersion W6 is minimized, however, the dispersion W6 may show the minimum value at a wrong position due to some factor. Based on that, the brightness level of the AD clock signal detecting region is compared to an expected value (previously set) in the phase where the dispersion W6 is judged to be minimum. Because the OB pixel region is light-blocked, there is an expected value as the DC off set in the design specification. When the brightness level of the AD clock signal detecting region is very different to the expected value, it is not possible for the AD clock signal ACK to be optimized. Therefore, it is judged whether or not a difference between the brightness level and the expected value is at most a threshold value (previously set) in the phase where the dispersion W6 is judged to be minimum. As far as the difference is at most the threshold value in a result of the judgment, the relevant phase is decided as the optimum value of the AD clock signal ACK. When the difference is larger than the threshold value, the difference and the threshold value are compared to each other in the phase where the dispersion W6 is secondarily small. The comparison and the judgment described above are repeated so that the optimum value of the phase of the AD clock signal ACK is decided.

A possible method of blocking light with respect to the imaging element 2 is to close a mechanical shutter to thereby block an incident light. However, it may not be necessary to close the mechanical shutter in the case where the OB pixel region, which is originally in the light-blocking state, is used as the AD clock signal detecting region.

Referring to FIG. 9 is given a further detailed description. In Step S31, the incident light is blocked when the mechanical shutter is closed. This step is unnecessary in the case where the OB pixel region is used as the AD clock signal detecting region. In Step S32, an analog gain is increased to amplify only the noise component. In Step S33, the phases of the reference sample pulse DS1 and the peak sample pulse DS2 are set to the predetermined optimum values, and the phase of the AD clock signal ACK is set to the initial value. In Step S34, the image data obtained by the imaging element 2 is fetched. In Step S35, the brightness level in the AD clock signal detecting region of the fetched image data is detected, in other words, an average value of the signal levels of the respective pixels in the AD clock signal detecting region is calculated. The processing of the Step S35 is executed in the brightness level detector 14. In Step S36, the phase of the AD clock signal ACK is shifted backward by one step in the state where the phases of the reference sample pulse DS1 and the peak sample pulse DS2 are fixed. After the shift of the phase by one step, the processings of the Steps S34-S36 are executed again. The processings of the Steps S34-S36 are repeated in the period of one cycle calculated by the sampling method judger 13, and the brightness level by each phase is thereby detected. The calculated brightness level is temporarily stored in a memory.

In Step S37, the phases of the reference sample pulse DS1 and the peak sample pulse DS2 are set to the optimum values decided by the foregoing method, and then, the phase of the AD clock signal ACK is set to the initial value. In Step S38, the image data obtained by the imaging element 2 is fetched again. In Step S39, dispersion σ (n) in the AD clock signal detecting region of the fetched image data is calculated, in other words, the dispersion of the signal levels of the respective pixels in the AD clock signal detecting region is calculated n is an arbitrary positive number and denotes number of settable phases in the period of one cycle calculated by the sampling method judger 13. The processing of the Step S39 is executed in the dispersion calculator 15. In Step S40, the phase of the AD clock signal ACK is shifted backward by one step in the state where the phases of the reference sample pulse DS1 and the peak sample pulse DS2 are fixed. After the shift of the phase of the AD clock signal ACK by one step, the processings of the Steps S38-S40 are executed. When the foregoing operation is repeated in the period of one cycle calculated by the sampling method judger 13, the dispersion by each phase is calculated. The calculated dispersion is temporarily stored in the memory. In the description, the distribution of the brightness level and the distribution of the dispersion are separately calculated at different times when the image data is fetched, however, they can be calculated at the same time in one fetch of the image data.

Thus processed, the distributions of the brightness level and the dispersion by each phase are stored in the memory. Then, the data stored in the memory is used to calculate the optimum phase of the AD clock signal ACK. Below is given a detailed description. In Step S41, the dispersion σ(1) of the first phase is set as a minimum value σ(min). In Step S43, the dispersion of the second phase and thereafter is set as σ(n), and each dispersion σ(n) is compared to the dispersion σ(min). When the σ(n) is smaller in the comparison, σ(n) is set as a new minimum value σ(min) in Step S44. The processings of the Steps S43-S44 are repeated until the last phase is done so that the phase where the dispersion is minimized can be calculated.

In Step S45, it is judged whether or not a difference between the brightness level of the phase where the dispersion is minimized and an expected value determined by the design specification is at most a threshold value (predetermined). When the brightness level in the phase where the dispersion is minimized is larger than the threshold value in the judgment of the Step S45, a processing of Step S46 is executed to the phase whose dispersion is smaller than that of the phase of σ(min). Then, the Steps S45 and S46 are repeated until the optimum phase is decided. When the brightness level in the phase where the dispersion is minimized stays within the threshold value after the processings of the Steps S45 and S46 are repeated, the phase obtained then is decided as the optimum phase of the AD clock signal ACK in Step S47.

According to the method described so far, the phases of the reference sample pulse DS1, peak sample pulse DS2 and AD clock signal ACK can be automatically adjusted. Therefore, in the case where the system in which the phase adjustment device is incorporated is changed, the imaging element 2 itself is replaced, or the characteristic of the imaging element 2 is changed due to an external factor (temperature, deterioration with age and the like), the signal (color), cycle and phase adjustment amount, which are the most suitable in the user specification and the manufacturing process, can be identified. Accordingly, the phase of the pulse outputted from the timing generator 6 can be automatically adjusted. Further, the phase of the pulse is differently adjusted under the most suitable conditions for the image quality and the processing speed in view of the characteristic of each pulse, and the phase of the pulse can be automatically adjusted with a high accuracy and at a high speed.

The preferred embodiment described so far is just an example, and can be variously modified within the scope of the intended purpose of the present invention.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A phase adjustment device comprising:
an intended-usage judger for judging an intended usage of an inputted digital imaging signal;
a selector for selecting one or a plurality of signals to be inspected from a group of signals constituting the digital imaging signal based on a result of the judgment by the intended-usage judger;
a phase adjuster for adjusting a phase of a pulse used when the digital imaging signal is picked up based on an output state of the signal to be inspected, and
a sampling method judger for calculating a cycle and a phase adjustment amount of the sampling as criteria of the phase adjustment based on an image size, a frame rate and a resolution necessary for the usage judged by the intended-usage judger,
wherein the digital imaging signal is generated based on an analog imaging signal outputted from an imaging element, and
the pulse includes a peak sample pulse for detecting a peak level of the analog imaging signal, a reference sample pulse for detecting a signal level used as a reference when the analog imaging signal is subjected to correlated double sampling, and an AD clock signal necessary for AD-converting the analog imaging signal into the digital imaging signal.

2. A phase adjustment method including:
a judging step performed by a processor for judging an intended usage of an inputted digital imaging signal;
a selecting step for selecting one or a plurality of signals to be inspected from a group of signals constituting the digital imaging signal based on a result of the judgment by an intended-usage judger; and
an adjusting step for adjusting a phase of a pulse used when the digital imaging signal is picked up based on an output state of the signal to be inspected, wherein the pulse includes a peak sample pulse for detecting a peak level of an analog imaging signal outputted from an imaging element, a reference sample pulse for detecting a signal level used as a reference when the analog imaging signal is subjected to correlated double sampling, and an AD clock signal necessary for AD-converting the analog imaging signal, and the adjusting step includes:

a step of detecting a first phase at which a brightness level is maximized by changing a phase of the peak sample pulse in a state where a phase of the reference sample pulse and a phase of the AD clock signal are fixed to an initial value, the step further setting the detected first phase as an optimum phase of the peak sample pulse;

a step of detecting a stable region in which variation of the brightness level is small by changing the phase of the reference sample pulse in a state where the phase of the peak sample pulse is fixed to the first phase and the phase of the AD clock signal is fixed to the initial value, the step further setting a second phase which is a center of the stable region as an optimum phase of the reference sample pulse; and a step of fixing the phase of the peak sample pulse to the first phase and the phase of the reference sample pulse to the second phase and detecting a third phase at which dispersion is minimized by changing the phase of the AD clock signal in a state where an incident light is blocked, the step further setting the detected third phase as an optimum phase of the AD clock signal.

3. The phase adjustment method as claimed in claim 2, wherein the adjusting step further includes a step of calculating a cycle and a phase adjustment amount of the sampling as criteria of the phase adjustment based on an image size, a frame rate and a resolution required in the usage judged in the judging step in each of the peak sample pulse, the reference sample pulse and the AD clock signal.

* * * * *